United States Patent [19]

Heinicke

[11] 4,306,282
[45] Dec. 15, 1981

[54] PULSE-CONTROLLED D-C CONVERTER WITH CAPACITIVE LOAD

[75] Inventor: Harald Heinicke, Erlangen, Fed. Rep. of Germany

[73] Assignee: Siemens Aktiengesellschaft, Munich, Fed. Rep. of Germany

[21] Appl. No.: 189,769

[22] Filed: Sep. 23, 1980

[30] Foreign Application Priority Data

Oct. 5, 1979 [DE] Fed. Rep. of Germany ....... 2940498

[51] Int. Cl.³ .......................................... H02M 3/315
[52] U.S. Cl. .................................................... 363/27
[58] Field of Search .................... 363/27, 28, 124, 135

[56] References Cited
U.S. PATENT DOCUMENTS 3,621,362 11/1971 Schwarz ................................ 363/27
3,921,054 11/1975 Heinicke ........................... 363/27 X
3,947,746 3/1976 Heinicke ............................... 363/28

FOREIGN PATENT DOCUMENTS 2446576 4/1976 Fed. Rep. of Germany ........ 363/27

Primary Examiner—William M. Shoop
Attorney, Agent, or Firm—Kenyon & Kenyon

[57] ABSTRACT

A voltage converter circuit for providing electrical energy to a capacitive load, the converter circuit having a pulse transformer having primary and secondary circuits. Pulse signals are provided in the primary circuit by thyristor devices. The thyristors are quenched by circuitry contained in the secondary circuit, comprising a storage capacitor which conducts a quenching current through a bank of power transistors to at least a portion of a secondary winding. A magnetizing current from a further secondary winding in the secondary circuit is utilized to charge the capacitor.

4 Claims, 2 Drawing Figures

PULSE-CONTROLLED D-C CONVERTER WITH CAPACITIVE LOAD

BACKGROUND OF THE INVENTION

This invention relates generally to D-C voltage converters, and more particularly, to a D-C voltage converter circuit which supplies electrical energy to a capacitive load, and which uses a capacitor in combination with at least one secondary winding of a pulse transformer to provide a pulse current.

Known single-ended D-C voltage converter circuits of the type which supply controlled currents and voltages to capacitive loads have utilized thyristors in the primary circuit of a pulse transformer, which thyristors are quenched by complex circuitry. Such circuitry may include additional thyristors which are used in conjunction with quenching capacitors and reversal chokes to achieve blocking of the conductive thyristors. Additionally, such circuits have dissipated the demagnetization energy of the pulse transformer in a resistor, or used it to charge a battery. The known circuits for achieving thyristor quenching in such converter circuits have reduced overall converter efficiency by diverting up to three percent of the power which would be transmitted to the capacitive load, for thyristor quenching purposes.

It is, therefore, an object of this invention to improve the efficiency of capacitively loaded D-C converter circuits, and thereby achieve reliable quenching of thyristors in the primary circuits using low quenching energy.

It is a further object of this invention to eliminate separate quenching and reversal thyristors which have been used in combination with quenching capacitors and reversal chokes to quench the thyristors at the primary windings of the pulse transformer.

SUMMARY OF THE INVENTION

The foregoing and other objects are achieved by this invention which provides a D-C voltage converter having thyristors which are pulse controlled connected to the primary side of a pulse transformer, the secondary side of the pulse transformer being provided with circuitry for quenching the thyristors on the primary side. At least one capacitor on the secondary side of the pulse transformer is charged during circuit operation and advantageously discharged through the secondary winding so as to induce a voltage in the primary winding which quenches the thyristors.

In one embodiment of the invention, the capacitors are charged by the pulse operation of the secondary winding. However, at such times as it is desirable to quench the thyristors, the capacitors are discharged by means of an electronic switching element through at least a portion of the secondary windings. Such a discharge produce a reverse bias voltage condition at the thyristors, thereby extinguishing them.

BRIEF DESCRIPTION OF THE DRAWINGS

Comprehension of the invention is facilitated by reading the following detailed description in conjunction with the annexed drawings in which.

DETAILED DESCRIPTION

Figure 1:
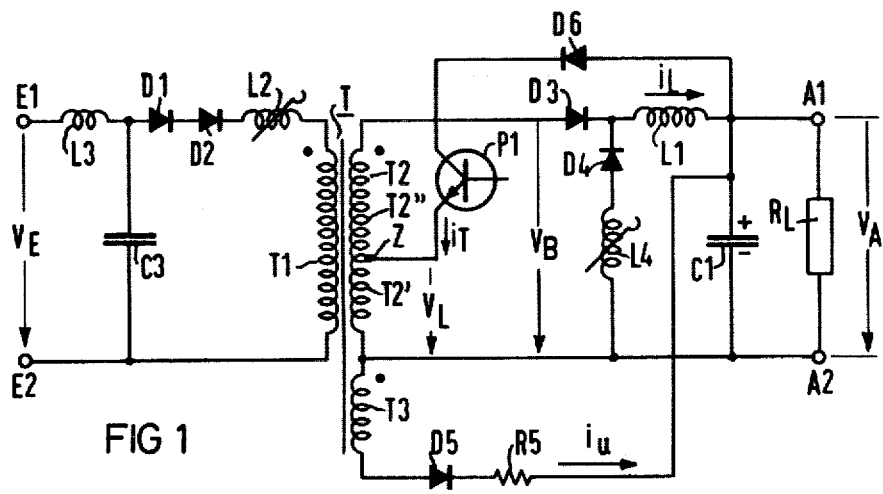
FIG. 1 is a schematic representation of a D-C converter circuit which operates in accordance with the principles of the invention.

FIG. 1 shows a main input voltage $V_E$ applied to input terminals E1 and E2 of a D-C voltage converter. A smoothing coil L3 is connected at one end to input terminal E1, and its other terminal to a filter capacitor C3. Filter capacitor C3 is connected at another end to input terminal E2, and is shunted by the series combination of thyristors D1 and D2, a step coil L2 and a primary winding T1 of a pulse transformer T. A first secondary winding T2 of pulse transformer T is connected to the anode of a diode D3. Diode D3 is connected at its cathode to the cathode of a diode D4 which is in series with a further step coil L4. Step coil L4 and first secondary winding T2 are connected at respective ends to an output terminal A2. The junction of the cathodes of diodes D3 and D4 are connected to output terminal A1 by means of a filter coil L1. A load $R_L$ is connected across output terminals A1 and A2. The load is shunted by a smoothing capacitor C1 which is charged by the first secondary winding T2.

A second secondary winding T3 is connected in series with a diode D5 and a resistor R5 to output terminal A1. This series circuit passes a pulse magnetizing current $i_u$ from the pulse transformer so as to further charge filter capacitor C1. Output terminal A1 is connected by a diode D6 to the collector of a transistor T1. Transistor T1 may be bank of parallel connected power transistors which are connected at their collective emitters to a tap Z of first secondary winding T2. Winding tap Z is provided at approximately ⅓ of the total number of turns of the first secondary winding T2, and conducts a pulse current $i_T$ which induces a voltage across primary winding T1 which quenches thyristors D1 and D2. The current $i_T$ flows from transistor bank P1 and through portion T2' of first secondary winding T2, and has a magnitude which corresponds approximately to three times the load current in the primary circuit T1. During such time as pulse current $i_T$ flows, thyristors D1 and D2 are reverse biased and thereby extinguished.

Upon termination of the conduction of pulse current $i_T$, the load current, which was previously flowing through diode D3, is conducted through step coil L4 and bypass diode D4. After the current $i_u$ has decayed, the converter is immediately ready to be switched on once again by thyristor firing circuitry (not shown) at the control terminals of thyristors D1 and D2.

Figure 2:
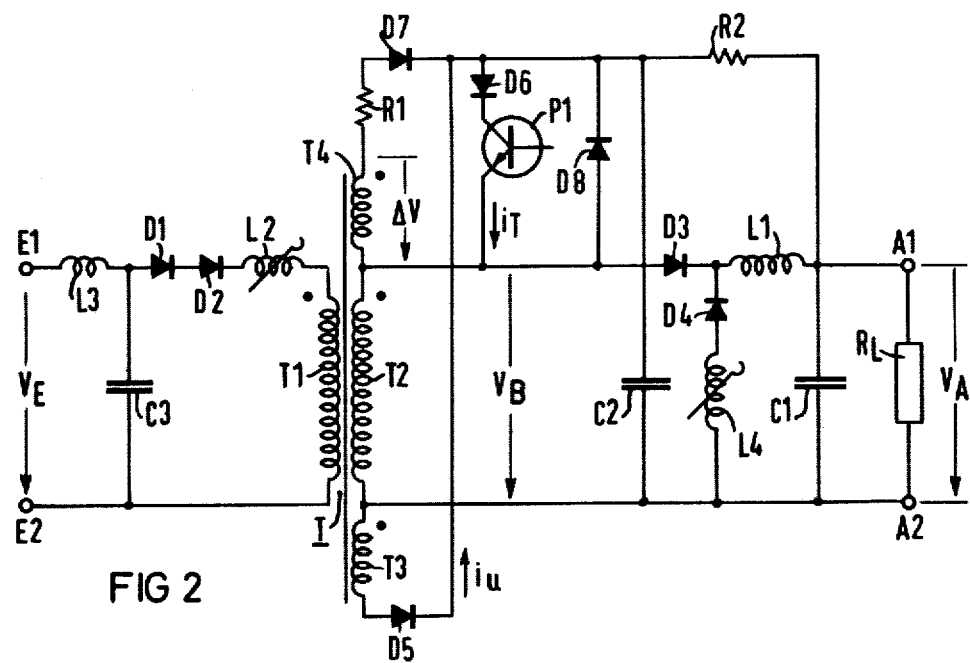
FIG. 2 is an alternative embodiment of the invention, shown in schematic form, which extinguishes the conduction of the thyristors on the primary side with a relatively small secondary current.

An alternative of the embodiment of the invention which permits an advantageous reduction in the pulse current $i_T$ which flows through transistor bank P1 is shown in FIG. 2. The embodiment of FIG. 2 is provided with a third secondary winding T4 which is connected at one end to the first secondary winding T2, and at its other end to a series circuit consisting of a resistor R1 and a diode D7. The cathode of diode D7 is connected to output terminal A1 by a resistor R2. Transistor bank P1, as indicated above with respect to FIG. 1, is provided with diode D6 which is conncted at its cathode to the collector terminals of the power transistors in the transistor bank. Diode D6 is connected at its anode to the junction of the cathode of diode D7 and resistor R2. The collective emitters of the transistors in the transistor bank P1 are connected to the junction of secondary windings T2 and T4. In this embodient, diode D5 which is connected at its anode to second secondary winding T3 is connected at its cathode to the cathode of diode D7. A pulse current storage capacitor C2 is connected across output terminal A2 and the junction of the cathode of diode D7 and resistor R2.

Thyristors D1 and D2 are quenched by a pulse current of the magnitude of the secondary load current, as described above with respect to the embodiment of FIG. 1. Quenching current $i_T$ is taken from pulse current storage capacitor C2, which is charged to about 1.1 times the magnitude of voltage $V_B$ across first secondary winding T2. Pulse current storage capacitor C2 is charged when the converter circuit is switched on for the first time, by operation of secondary windings T2 and T4, resistor R1 and diode D7. In addition, pulse current storage capacitor C2 is rapidly pre-charged by diode D8 which is shunted across transistor bank P1 and blocking diode D6. During normal pulse operation, the charge on pulse current storage capacitor C2 is replenished by current $i_u$ from second secondary winding T3. In view of the plurality of charging paths available for pulse current storage current capacitor C2, the possibility of undesirable overcharging of pulse current storage capacitor C2 during the times that the output currents are relatively small is reduced by providing resistor R2 which draws some of the overcharging current to output terminal A1.

In one practical embodiment of the circuit of FIG. 2, a load current $i_L$ can be produced in the range of 30 to 100 amps so as to provide an output power $P_A$ of 3 to 10 kW at an output voltage $V_A$ of 117 volts. A minimum secondary voltage across secondary winding T2 has been achieved at $V_B=238$ V, with a current $i_u$ between 1.8 and 6 amps. In such an embodiment, capacitor C2 is chosen between 40 and 125 µf, the resistance of resistor R1 at between 8 and 1.6 ohm, and the resistance of resistor R2 at between 3.3 and 1.04 ohms. Thus, in the practical embodiment, the following relationships apply:

$t_s$ = recovery time (30 µs)

$\Delta V$ = overcharge ($\Delta V = 0.1 \, V_B$ min)

$T_{max}$ = maximum period (12.5 ms)

$T_{min}$ = minimum period (2 ms)

$t_{back}$ = demagnetizing time (1 ms)

d = duty cycle (d = $t_s$/0.5 $t_{back}$)

$i_u = i_L (d/(1+d))$ $C2 = (i_L \cdot t_s)/\Delta V$ $R1 = 0.1 \, T_{min}/C2$ $R2 = 10 \, T_{max}/C2$ For an input voltage $U_E=600$ V., the turns ratios of pulse trnsformer T should be:

T1:T2:T3:T4 = 1.75:1:1:0.1,
and for $V_E=750$ V.,

T1:T2:T3:T4 = 2.2:1:1:0.1

Although the inventive concept disclosed herein has been described of specific embodiments and applications, other applications and embodiments will be obvious to persons skilled in the pertinent art without departing from the scope of the invention. The drawings and descriptions, and practical embodiments of the invention in this disclosure are illustrated of applications of the invention and should not be construed to limit the scope thereof.

What is claimed is:

1. A D-C voltage converter circuit for controlling a voltage at output terminals for connecting a capacitive load, the circuit being of the type having a pulse transformer having primary and secondary circuits, the primary circuit having at least one thyristor for producing electrical pulses in the primary circuit, the secondary circuit including said output terminals having a quenching arrangement for extinguishing conduction of the thyristor in the primary circuit and the second circuit further having a first current path for the demagnetizing current, the converter circuit having a second current path containing a bypass diode being associated with the load, the converter circuit being CHARACTERIZED IN THAT the secondary circuit is further provided with:

at least a first capacitor for providing a pulse current to a predetermined portion of a first secondary winding of the pulse transformer;

first diode means connected to said first secondary winding for charging said capacitor;

discharge means comprising a transistor bank and a second diode means for conducting said pulse current to said predetermined portion of said first secondary winding; and a second secondary winding for producing said demagnetizing current, said demagnetizing current being conducted through a third diode means to said first capacitor.

2. The converter circuit of claim 1 wherein said output terminals are shunted by said first capacitor, and said first diode means are connected in series with a filter coil.

3. The converter circuit of claim 1 wherein there is further provided:

a second capacitor for storing and providing said pulse current, said second capacitor having a first and a second terminal;

a third secondary winding connected in series with said first secondary winding for providing a charging signal;

first charging means connected in series with said third secondary winding, said first charging means comprising a first diode in series with a resistor for coupling said charging signal to said second terminal of said second capacitor and to the capacitive load;

said first charging means connected in series with said third secondary winding in antiparallel to said discharge means, said discharge means conducting said pulse current to said first secondary winding;

second charging means for coupling said first secondary winding to said second terminal of said second capacitor;

said second secondary winding connected to said first secondary winding and to said first terminal of said second capacitor; and third charging means for conducting said demagnetizing current from said second secondary winding to said second terminal of said second capacitor.

4. The converter circuit of claim 3 wherein there is provided voltage limiting means for conducting an overcharge current from said second terminal of said second capacitor to said first capacitor.

* * * * *